(12) United States Patent
Bestmann

(10) Patent No.: US 8,159,719 B2
(45) Date of Patent: Apr. 17, 2012

(54) METHOD FOR CORRECTING THE GRAY BALANCE OF A PRINTING PROCESS

(75) Inventor: Günter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 809 days.

(21) Appl. No.: 12/170,686

(22) Filed: Jul. 10, 2008

(65) Prior Publication Data

US 2009/0015855 A1  Jan. 15, 2009

(30) Foreign Application Priority Data

Jul. 10, 2007 (DE) .......................... 10 2007 031 965

(51) Int. Cl.
*G06F 15/00* (2006.01)
*H04N 1/40* (2006.01)

(52) U.S. Cl. ......... 358/3.01; 358/3.02; 358/1.9; 358/2.1
(58) Field of Classification Search ............... 358/3.01, 358/3.02, 1.9, 2.1
See application file for complete search history.

(56) References Cited

U.S. PATENT DOCUMENTS

| | | | |
|---|---|---|---|
| 5,117,293 A * | 5/1992 | Asada et al. ................. | 358/2.1 |
| 5,604,567 A | 2/1997 | Dundas et al. | |
| 6,230,622 B1 | 5/2001 | Dilling | |
| 6,606,167 B1 | 8/2003 | Rees et al. | |
| 6,694,883 B2 | 2/2004 | Hauck | |
| 6,775,030 B2 | 8/2004 | Krabbenhöft et al. | |
| 6,919,972 B2 | 7/2005 | Kumada et al. | |
| 6,985,678 B2 * | 1/2006 | Maebashi et al. ............... | 399/39 |
| 7,312,893 B2 | 12/2007 | Bestmann et al. | |
| 7,859,718 B2 * | 12/2010 | Miyazaki ....................... | 358/1.9 |

FOREIGN PATENT DOCUMENTS

| | | |
|---|---|---|
| DE | 19822662 A1 | 11/1999 |
| DE | 1184176 A2 | 3/2002 |
| DE | 102 26 563 A1 | 1/2003 |
| DE | 10205476 A1 | 8/2003 |
| DE | 10341994 A1 | 3/2005 |
| DE | 102004044763 A1 | 3/2006 |
| DE | 102006048556 A1 | 5/2007 |
| EP | 0685962 A2 | 12/1995 |
| EP | 1187464 A2 | 3/2002 |
| EP | 1 222 810 B1 | 7/2002 |
| EP | 1275502 A1 | 1/2003 |

* cited by examiner

*Primary Examiner* — Charlotte M Baker
(74) *Attorney, Agent, or Firm* — Laurence A. Greenberg; Werner H. Stemer; Ralph E. Locher

(57) ABSTRACT

A method for correcting gray balance of a printing process includes imaging printing forms assigned to color separations with a test form, printing a printing material using the printing forms in a printing press and calorimetrically measuring the test form printed onto the printing material. It is undesirably possible to produce a new color error in other tonal value ranges due to changing the layer thickness of a process ink to correct the gray balance. In order to perform a gray balance correction without disruptive secondary effects, a test form is imaged with colored gray areas, after their colorimetric measurement, at least two of the colored gray areas are selected and, based on their color values, a corrected tonal value of a non-black chromatic process ink is determined, and this corrected tonal value is recorded as a corrected set point of the process ink for imaging following printing forms.

15 Claims, 6 Drawing Sheets

| Area | Tonal values | | | Absolute color measured values | | |
|---|---|---|---|---|---|---|
| | Cyan | Magenta | Yellow | L* | a* | b* |
| 6 | 0 | 0 | 0 | 95.83 | -0.78 | -1.87 |
| 2a | 50 | 39 | 39 | 62.11 | -2.55 | -0.35 |
| 2b | 50 | 41 | 36 | 61.42 | -0.65 | -3.38 |
| 2c | 50 | 41 | 39 | 60.89 | -1.03 | -0.44 |
| 2d | 50 | 41 | 41 | 60.89 | -1.02 | 0.77 |
| 2e | 50 | 43 | 39 | 60.10 | 0.67 | -0.70 |

FIG. 2

| Area | Tonal values | | | Relative color measured values | | | Color values |
|---|---|---|---|---|---|---|---|
| | Cyan | Magenta | Yellow | L* | a* | b* | |
| 6 | 0 | 0 | 0 | 100.00 | 0.00 | 0.00 | |
| 2a | 50 | 39 | 39 | 65.02 | -2.08 | 0.98 | |
| 2b | 50 | 41 | 36 | 64.31 | -0.11 | -2.14 | 7b |
| 2c | 50 | 41 | 39 | 63.76 | -0.51 | 0.87 | 7c |
| 2d | 50 | 41 | 41 | 63.76 | -0.50 | 2.11 | |
| 2e | 50 | 43 | 39 | 62.94 | 1.25 | -0.59 | 7e |

FIG. 3

METHOD FOR CORRECTING THE GRAY BALANCE OF A PRINTING PROCESS

CROSS-REFERENCE TO RELATED APPLICATION

This application claims the priority, under 35 U.S.C. §119, of German Patent Application DE 10 2007 031 965.9, filed Jul. 10, 2007; the prior application is herewith incorporated by reference in its entirety.

BACKGROUND OF THE INVENTION

Field of the Invention

The present invention relates to a method for correcting the gray balance of a printing process, in which printing forms assigned to color separations are imaged with at least one test form, at least one printing material is printed through the use of the printing forms in a printing press and the test form printed onto the printing material is measured calorimetrically.

The gray balance is defined as a set of tonal values for colored process inks, such as cyan, magenta and yellow (CMY), for which printing under defined observation conditions results in an achromatic color. The predefined printing conditions therefor are defined, for example, in process standards, such as the offset printing process standards from the BVDM or the German Federal Print and Media Association. They are in turn based on the stipulations from the ISO (ISO 12647-2:2004). The observation conditions are likewise standardized by the ISO.

Suitable printing processes are, for example, digital printing processes, such as electrophotography or other "non-impact printing" processes. In addition, conventional printing processes, such as gravure printing or offset printing, are possible as a printing process.

For those printing processes, in reproduction technology, printing originals are produced for printed pages, containing all of the elements to be printed such as text, graphics and images. In the case of the electronic production of the printing originals, those elements are present in the form of digital data. For an image, the data is produced, for example, by the image being scanned point by point and line by line in a scanner, with each image point being broken down into color components and the color components being digitized. Normally, images are broken down in a scanner into the color components red, green and blue (RGB), which is to say into the components of a three-dimensional color space. For a color printer, however, other color components are needed. In that case, in general terms, various colored printing inks and black are used in order to produce a correspondingly colored printing image on a printing material. In the case of four-color printing, they are the printing inks cyan, magenta, yellow and black (CMYK), which is to say the components of a four-dimensional color space. For that purpose, the image data from the RGB color space from the scanner are transformed into the CMYK color space of the printing process to be used.

During that transformation, each color value is assigned a combination of the process inks, which is to say the printing inks of the output color space. Each process ink in that case is assigned its own printing original, which is known as a color separation. Printing plates are produced from the individual color separations for offset printing.

In order to produce the printing plates, initially films can be exposed and the printing plates can then be imaged through the use of these films. In current digital imaging methods, the printing plates assigned to the individual color separations are produced by the plates being exposed in a plate exposer. For that purpose, through the use of a so-called raster image processor (RIP), initially a digitally rastered bit map is produced, which specifies which points on the printing plate are to be exposed and which are not. Each color value to be produced is assigned a tonal value from the corresponding color separation by the RIP. For instance, the predefined color values can be represented by the color components CMYK digitized with eight bits. This means that each color component of the process inks is assigned 256 density steps in this case. The tonal value of a raster point is determined by the number of exposer points, which is to say the exposer pixels, imaged in the raster cell assigned to the raster point. In that case, a raster cell includes, for example, 255 possible individual pixels. The result is a tonal value of 0 to 100% for this raster point, depending on how many of those pixels are exposed in a raster cell on a printing plate.

In order to produce specific tonal values through the use of the different color separations, the tonal value combinations of the process inks which correspond to the predefined color values are stored in a color profile. In order to reduce the size of a corresponding table memory, not all of the possible combinations of the color components CMYK are stored, but only the value combinations for a coarser regular grid of points of intersection in the CMYK color space. For CMYK value combinations which lie between the grid points and, respectively, for corresponding color values of a device-independent color space, such as $L^*a^*b^*$ or YXZ, the tonal value combinations and color values sought are interpolated from the adjacent points of intersection.

Since there is a plurality of CMYK color value combinations which correspond to an individual color value from the device-independent color space, there are also different possible ways of storing a corresponding profile for the assignment in order to obtain a unique assignment of color values and tonal value combinations. That profile can be built up differently depending on the requirement. For example, European Patent EP 1 222 810 B1, corresponding to U.S. Pat. No. 6,775,030 B2, discloses transferring color values from a first color space into a second color space or mapping them to that color space, so that the visual impression of the colors in the two color spaces is the same while preserving the black build-up. Thus, the lightness curves of the different black inks are linked with one another by a device-independent color space. In addition, the pure non-black colored inks are linked exclusively to colored inks from the other color space by appropriate transformation functions based on the device-independent color space. In this way, purely chromatic colors are built up exclusively through the use of chromatic inks and purely black regions are produced only by black tonal values.

On the other hand, there is not only a need to produce the color values in a specific way through the use of tonal value combinations of the process inks in a printing process, but the problem also arises that, depending on the equipment, inks and other boundary conditions being used, the color values actually produced on the printing material in the printing process deviate from the predefined desired values from the profile. German Published, Non-Prosecuted Patent Application DE 102 26 563 A1 has therefore disclosed a method in order, before the production of printing plates, to produce test printing forms which have test forms that are assigned to specific desired color values and are formed by different tonal value combinations. Due to the exposure of corresponding test printing forms and the use in a specific printing process, by measuring the test forms produced on the printing material, a relationship between the actual color values produced and the predefined color value set points can be produced and the assignment of the tonal value combinations of the process inks to the color value set points can be stored in corrected form in a process calibration in accordance with a form tonal value characteristic curve for the imaging of printing forms for that printing process.

Furthermore, it is possible to control fluctuations and deviations in a printing process through the use of presettings or readjustments of inking zone screws. By using the latter, the layer thickness of a process ink can be varied manually within limits in order to achieve matching of the actual color values to the desired color value set points in this way, even during the printing process without any re-imaging of printing plates.

If, then, a corresponding form tonal value characteristic curve for the imaging of a printing form is stored and there is an assignment of color value set points to specific tonal value combinations according to a profile, the printing plates are imaged in accordance with the individual color separations and used in a printing press. If it is determined in that case that the actual color values do not correspond to the color value set points, then the inking zone screws are readjusted and the layer thickness of the corresponding process ink is increased or reduced. As a result, however, both the full-tone colors of the corresponding process ink and the corresponding tonal value gains and therefore, overall, the combined printing behavior, is changed. Due to that change in the layer thickness, a desired effect can only be achieved within limits in order to match the actual values to the set points, since all of the color values change globally. For instance, it may be desirable just to correct the gray balance in a tonal value range but, in an undesired way, a new color error is produced in another tonal value range as a result.

For instance, it may occur that, in order to counteract a red color error in the quarter-tone range, either the layer thickness of cyan has to be increased or that of yellow and magenta has to be reduced. As a result, the inking and tonal value gains of the process inks involved increase or decrease. The error in the gray reproduction in the quarter-tone region is corrected by that measure but it is possible for a displacement of the gray reproduction in the three-quarter tone to occur. At the same time, the error in the color values and the tonal value gain increases.

As a result of that correction by layer thickness variation, compromises have to be tolerated due to the production of other errors or discolorations. In addition, those corrections have to be carried out again during each printing operation.

It is precisely when other papers and/or other printing inks are used in a print shop than those which were present for the production of the form tonal value characteristic curve that, despite correctly set inking and correctly calibrated tonal value gain, differences in the gray reproduction result. Although it is possible to compensate therefor through the use of the layer thickness variation described, other undesired errors arise, however, and in addition there are regularly occurring rejects when starting printing.

SUMMARY OF THE INVENTION

It is accordingly an object of the invention to provide a method for correcting the gray balance of a printing process, which overcomes the hereinafore-mentioned disadvantages of the heretofore-known methods of this general type and with which regularly occurring rejects can be reduced and the occurrence of undesired inking fluctuations can be avoided.

With the foregoing and other objects in view there is provided, in accordance with the invention, in a method for correcting the gray balance of a printing process, which includes imaging printing forms assigned to color separations with at least one test form, and printing at least one printing material with the printing forms in a printing press and calorimetrically measuring the test form printed onto the printing material, the improvement comprising providing the at least one test form with colored gray areas, building-up the colored gray areas from at least three different non-black process inks, assigning at least three colored gray areas to surroundings of the same nominal gray value within a device-independent color space, causing the tonal values of at least one process ink of the at least three colored gray areas in at least two colored gray areas to deviate from a tonal value assigned to the nominal gray value, so that the colored gray areas have tonal value combinations differing from one another in pairs, determining the color values of the at least three colored gray areas in the device-independent color space after the calorimetric measurement, selecting at least two colored gray areas from the measured colored gray areas, determining at least one corrected tonal value of a non-black chromatic process ink having different tonal values in the selected colored gray areas on the basis of the color values determined for the selected colored gray areas, and recording the corrected tonal value as a corrected set point for the chromatic process ink for the corresponding nominal gray value of the device-independent color space for imaging following printing forms.

Provision is made for at least one test form to be imaged on a printing form and then printed onto a printing material. This test form is to contain colored gray areas. Therefore, provision is in particular made for this test form to be imaged on the different printing forms of the color separations in such a way that corresponding colored gray areas occur on the printing material. The printing forms provided in this case are preferably printing plates, which are preferably exposed directly in a printing plate exposer. The printing plate exposer being used can, for example, be an external drum exposer.

The colored gray areas from the test form in this case are built up from at least three different non-black process inks. The at least three colored gray areas are assigned to the surroundings of a joint nominal gray value within a device-independent color space.

This nominal gray value is assigned specific tonal value combinations of the process inks, for example in accordance with a standard profile. In order to produce the at least three colored gray areas, provision is further made for the tonal values of at least one process ink to differ from a tonal value assigned to the nominal gray value, which means that, in the different colored gray areas, different tonal values of this variable process ink are to be provided. In this way, colored gray areas with tonal value combinations different from one another in pairs result.

Through the use of appropriate imaging of printing forms, these test forms are imaged on the printing forms and finally transferred to a printing material in a printing press. The colored gray areas transferred to the printing material in this way are measured calorimetrically and their color values are determined in a device-independent color space. The device-independent color space being used can, for example, be an LAB or a YXZ color space.

Following the colorimetric measurement of the colored gray areas, at least two colored gray areas from the colored gray areas are selected and, on the basis of the color values of these selected colored gray areas, at least one corrected tonal value of the non-black chromatic process ink which has different tonal values is determined, and this corrected tonal value is used as a corrected set point of the chromatic process ink for the predefined corresponding nominal gray value in the device-independent color space for the imaging of following printing forms. For this purpose, an appropriate tonal value combination of the non-black process inks with the corrected set point of the varied process ink is stored appropriately.

The colorimetric measurement is to be understood, for example, to mean a spectral color measurement which determines the color value of a colored gray area. For this purpose, for example, in reflection the light reflected from the printing material can be measured and, through the use of an optical filter, the different components of the reflected radiation can be determined in the device-independent color space or based on the human eye.

In accordance with another mode of the invention, provision is advantageously made for the tonal values of the varied deviating process ink to be selected in such a way that the color values of at least two of the colored gray areas lie in different regions of the device-independent color space and, from the measured colored gray areas, for those to be selected which have color values in different quadrants of the device-independent color space.

In this way, through the use of linear calculations from color values of these at least two colored gray areas, first approximate values for the corrected tonal value of the deviating process ink can be determined. This can be achieved, for example, through the use of a linear function between the color values of the colored gray areas, by the tonal values of the deviating process ink which, according to this formula, would lie on the points of intersection with the axes of the device-independent color space being determined.

In accordance with a further mode of the invention, provision is made for at least five colored gray areas from the at least one test form to be included.

In particular, it can also be especially preferred to provide exactly five colored gray areas for the at least one test form. In this way, the smallest possible space required for the colored gray areas of the test form and therefore also for the test form itself can be ensured.

These colored gray areas should be built up from at least three different chromatic process inks. Suitable process inks in this case in a preferred printing process are the inks cyan, magenta and yellow (CMY). If special inks or other inks are used, the colored gray areas can, of course, be built up from the various chromatic process inks.

One of these process inks should then have a constant value, which is to say a specific tonal value, in all of the colored gray areas of this one test form. In the case of a four-color print, it is particularly preferred in this case to select the process ink cyan (C) for this constant process ink.

Furthermore, provision is made for each test form used to be assigned to the surroundings of a nominal gray value of the device-independent color space. For instance, nominal gray values which, according to a standard profile, have cyan values of 25%, 50% and 75% can be provided in the device-independent color space. In this case, it is particularly worth recommending to determine the tonal values from the standard profile which lead to a neutral colored gray and to provide a central colored gray area therefrom. This can preferably be positioned in the center of a test form. In this way, a central colored gray area results which has corresponding tonal values of cyan, magenta and yellow (CMY) or other process inks which are assigned to the nominal gray value which is represented by the test form.

Since one process ink is kept constant, provision is made to vary the other chromatic process inks (MY) in the other colored gray areas of the test form. Higher or lower tonal values are then used for these variable chromatic process inks than those defined from the standard profile, which means that these value combinations differ from the combination of the predefined set points in the central colored gray area. When five colored gray areas are used in a test form, the result is a central colored gray area which is built up by a tonal value combination of three chromatic process inks, which is stored in a standard profile, and by four further differently built up colored gray areas which, in pairs from one another and from the central area, have different combinations of tonal values of these three process inks. In this case, provision can in particular be made for two colored gray areas to always be provided in which one of the variable chromatic process inks lies above the set point predefined by the standard profile and two further colored gray areas to be provided in which this variable chromatic process ink has lower tonal values than predefined for this nominal gray value.

It is easy to see that when more than three different chromatic process inks are used, more than five colored gray areas are preferably also used. In the event that four different chromatic process inks are used, it is thus possible for a total of, for example, 13 colored gray areas to be provided.

As a result of the use of different test forms which are assigned different gray values, it is firstly possible for new corrected set points to be determined from these different gray values. In this case, if one process ink is kept constant, then the result is a particularly simple configuration of test forms. The number of colored gray areas which is necessary for the determination of the corrected set points is limited to a minimum.

In accordance with an added mode of the invention, provision is made for the deviations of the tonal values of the variable chromatic process inks in the remaining colored gray areas of the test form to be carried out in steps of ±2% to ±3% from the set points from the standard profile for the nominal gray value.

In accordance with an added mode of the invention, provision is advantageously made for at least three colored gray areas to be selected from the measured colored gray areas, with the condition for these selected colored gray areas being that they lie in different quadrants of the device-independent color space. In this way, it is possible to ensure that, through the use of a one-dimensional linear interpolation which is also provided for a process ink that is different in terms of tonal value in two colored gray areas, and these two colored gray areas lie precisely in two different quadrants, an interpolated tonal value can be calculated and should be calculated which corresponds to a color value on an axis of the device-independent color space and, through the use of an iterative repetition of this linear interpolation for the variable process inks which is also provided, overall new corrected set points of the tonal values for these variable process inks are determined which correspond to at least one actually printed color value that lies closer to the nominal gray value of the device-independent color space than the measured printed gray value from the central colored gray area.

In accordance with an additional mode of the invention, provision is made for the color values from the colored gray areas to be normalized to the white point of the printing material. In this way, it is advantageously possible to operate with color values in the way in which they act on the human eye, after chromatic adaptation to the white of the medium has been carried out.

In accordance with yet another mode of the invention, provision is made for the color values of the colored gray areas to be normalized to equally light color values of the black process ink. In this alternative method, the reference value selected for the gray is the black process ink. It is thus ensured in this case that the same gray values of a colored gray area correspond to a corresponding gray value which is formed from the black process ink.

In accordance with yet a further mode of the invention, provision is made for the condition provided for the selected colored gray areas to be that those colored gray areas in the device-independent color space are selected having color values which lie closest to the gray axis of the device-independent color space. Thus, for example, from three different quadrants, in each case the colored gray areas which lie closest to the point of intersection of the axes of the device-independent color space are selected. In order to permit normalization of the color values of the colored gray areas to the media white point, that is to say the white point of the printing material, provision is advantageously also made for the at least one test form to include a paper white area for the determination of the white point of the paper, i.e. of the printing material.

In accordance with yet an added mode of the invention, in order to allow a user of the method described an overview of the gray balance of the printing process, provision is advantageously made for the measured values from the colorimetric measurement of the colored gray areas to be displayed in a diagram on a display device. It is then possible, for example, for the selection of the selected colored gray areas to be influenced by a user.

In accordance with yet an additional mode of the invention, in order to simplify the determination of the corrected or interpolated tonal values, provision is advantageously made for only the color value components of one plane, preferably the chroma plane of the device-independent color space, to be used for this purpose.

In accordance with again another mode of the invention, provision is made for various test forms with different nominal gray values to be imaged onto the printing plates. On the basis of these test forms, corrected set points of the chromatic inks associated with the nominal gray values can then be determined, and gray values which lie between the gray values of the test form corrected tonal values can be determined through the use of a smooth and harmonious correction curve. In this way, the nominal gray values of the test forms being used correspond to reference points in the device-independent color space. Through the use of the method described, corrected tonal value set points are determined for the individual process inks which are better associated with these nominal gray values and, through the use of the smooth and harmonious correction curve described, new corrected set points can also be determined for tonal values of the chromatic inks which correspond to nominal gray values that lie between the gray values of the test form being used.

In accordance with again a further mode of the invention, the correction curve determined in this way is intended to be used further for the process calibration of following printing forms. In this way, through the use of an iterative process, a correction curve for the exposure of printing forms can be determined which permits a particularly good representation of the gray balance, without further color deviations arising from this correction having to be accepted.

In accordance with a concomitant mode of the invention, particularly preferably, the test forms are imaged in the manner of print control strips or process control strips in individual inking zones of printing forms which are used for conventional printing in a printing press, and the test forms are to be evaluated regularly in order to achieve a corrected process calibration for following imaged printing forms. In this way, through the use of a simple method which is assigned to each imaged printing form, an iterative improvement of the process calibration is achieved, so that rejects as printing is started up for a printing process become fewer and fewer.

Other features which are considered as characteristic for the invention are set forth in the appended claims.

Although the invention is illustrated and described herein as embodied in a method for correcting the gray balance of a printing process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a table showing absolute color values from the measured form;

FIG. 3 is a table showing relative colored values from the test form;

DETAILED DESCRIPTION OF THE INVENTION

Figure 1:
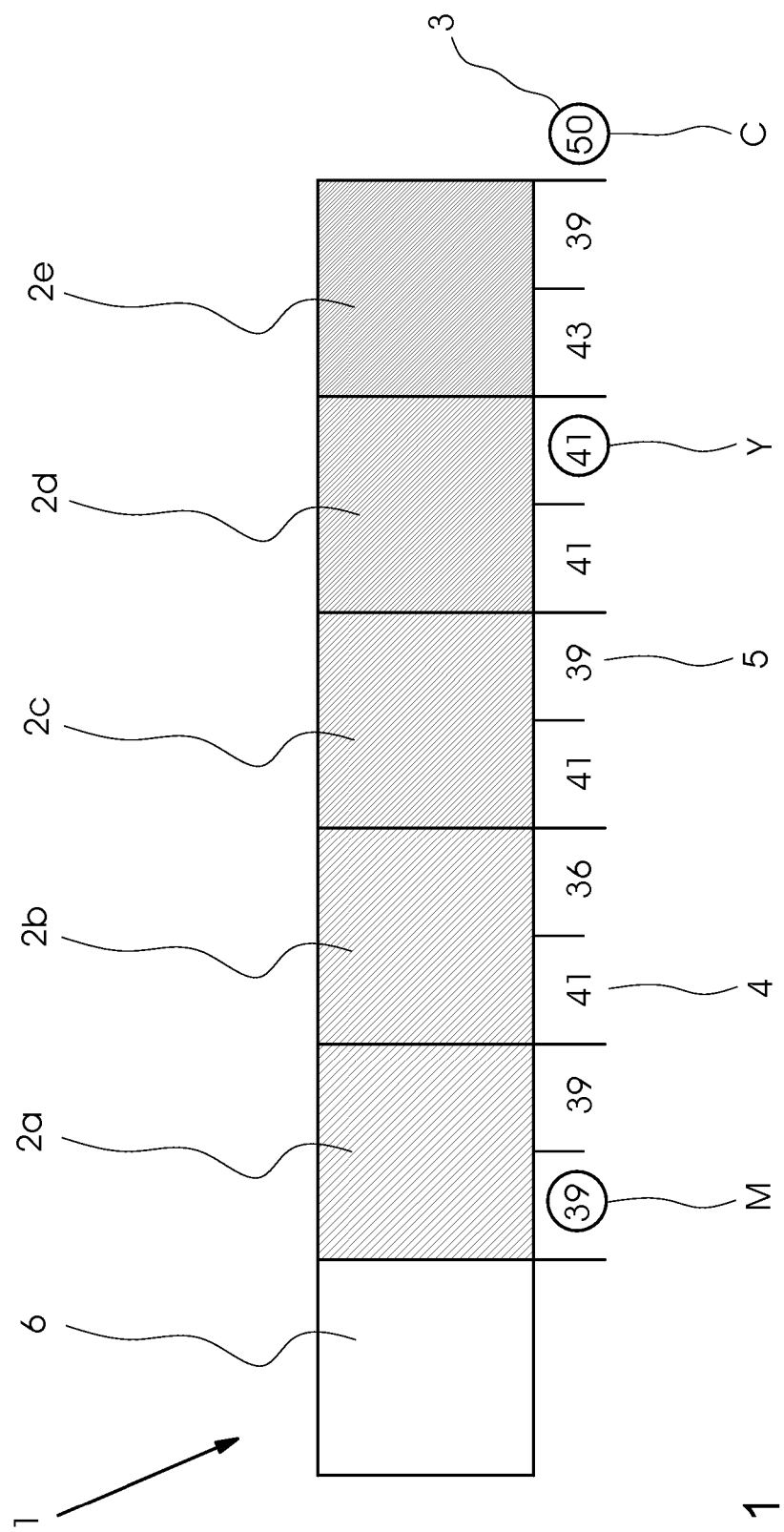
FIG. 1 is a diagrammatic, top-plan view of a test form as a one-dimensional gray element.

Referring now to the figures of the drawings in detail and first, particularly, to FIG. 1 thereof, there is seen a one-dimensional colored gray element 1, which is illustrated as a test form. This control element is also designated as a gray spot. In order to carry out the method according to the invention, provision is made for a plurality of such colored gray elements to be provided in each case in an inking zone of a printed image.

The colored gray element 1 illustrated herein includes a total of five colored gray areas 2a to 2e. The colored gray areas 2a to 2e are in each case built up from the three chromatic process inks cyan (C) magenta (M) and yellow (Y).

A tonal value 3 of the cyan process ink is represented by a number, kept in cyan, at the right-hand edge of the colored gray element 1. The tonal value 3 of the cyan process ink is constant for all of the colored gray areas 2a to 2e of the colored gray element 1.

Tonal values 4 and 5 for the magenta and yellow process inks are illustrated underneath the individual colored gray areas 2a to 2e. The left-hand number always corresponds to the tonal value 4 of the magenta process ink, and the right-hand number to the tonal value 5 of the yellow process ink. The five colored gray areas 2a to 2e have combinations, in each case different from one another in pairs, of the tonal values 3, 4, 5 of the cyan, magenta and yellow process inks. In this case, the tonal value 3 of cyan is 50% in all of the colored gray areas. The tonal values 4 and 5 of the magenta and yellow inks are varied in the individual colored gray areas 2a to 2e from 39% to 43% for the magenta process ink and from 36% to 41% for the yellow process ink.

The variation in the tonal values 3, 4 is always 2 percentage points.

The central colored gray area 2c lies in the center of the colored gray element 1. This colored gray area is built up by a combination of the CMY inks with tonal value combinations 50, 41, 39. This combination of the tonal values 3, 4, 5 of the cyan, magenta and yellow inks corresponds to a predefined nominal gray value, in accordance with a standard profile not illustrated herein. Provision can also be made for a gray value predefined in accordance with a standard profile to be located, for example, at a defined gray balance of 50-40-40 of the chromatic inks cyan, magenta and yellow. The central colored gray area 2c is then built up from the tonal values 3, 4, 5 in such a way that it lies at least in the vicinity of this nominal gray value but deviates slightly therefrom. In this way, the determination of the real gray value can be carried out more quickly through the use of possible tonal value combinations of the cyan, magenta and yellow process inks.

For other colored gray elements 1, not illustrated herein, within an inking zone of the printing material, which is to say of the printing press, different nominal gray values are sought which are assigned various tonal values 3 of the cyan process ink. For example, within an inking zone of the printing press, three colored gray elements 1 can be provided which have different tonal values 3 of 25%, 50% and 75% of the cyan process ink. The tonal values 4 and 5 of the magenta and yellow inks for the central colored gray areas 2c of these colored gray elements 1 are then selected in accordance with the standard profile in such a way that they either correspond to the nominal gray value of these colored gray elements 1 or at least lie very close to this nominal gray value.

The colored gray elements 1 assigned to a non-illustrated process control strip of a printing form are thus produced with a suitable test print or preferably printed along with a running job. These colored gray elements 1 that are also printed are measured, evaluated and new corrected set points of the tonal values 3, 4, 5 of the cyan, magenta and yellow inks are determined, which at least lie closer to the actual nominal gray value of the respective colored gray elements 1 than the central colored gray areas 2c initially present. These values are then stored in corresponding calibration curves for the plate exposure and also taken into account automatically during future plate exposures. In this way, a correction of the set points for the tonal values 3, 4, 5 is continuously achieved. In addition, this correction can be restricted to specific tonal value ranges of the tonal values 3, 4, 5, such as the quarter-tone range, which means that an indirect influence on other tonal value ranges is prevented.

The nominal gray value which is assigned to the central colored gray area 2c of a colored gray element 1 is defined substantially by the fact that this value has no colored elements in a device-independent color space, such as a LAB space, or at least lies substantially on the gray axis of this color space.

The gray axis of this device-independent color space can be defined in different ways, with not every definition being necessarily desirable for a gray value in order to obtain a gray balance acceptable to the human eye. In a first definition, a gray value can be defined by a neutral hue in the CIELAB color space with combinations $a^*=0$ and $b^*=0$. This would then be a neutral hue in the device-independent color space. However, since the human eye adapts to the whiteness of the surroundings, which in this case is the printing material, this approach to the definition of a gray value would not be desirable, since the human eye would see the corresponding hue with absolute values of $a^*=b^*=0$ on the printing material as not neutral.

In practice, therefore, another definition for gray will generally be used, that is the gray value
 a) being defined as a hue which has the same $a^*$ and $b^*$ values of the CIELAB color space as the printing material or
 b) being defined as a color value which has the same $a^*$ and $b^*$ values of the CIELAB color space as an equally light hue of black printing ink on the printing material.

In order to correct the gray balance, it is then possible to work with a nominal gray value according to one of these two definitions of the color gray. Work is then not carried out with absolute color values $L^*_{ab}$ $a^*_{ab}$ $b^*_{ab}$ but with relative color measured values $L^*a^*b^*$ which are based on the printing material or on the black printing ink.

In the following text, the nominal gray values are understood to be the relative gray values which are normalized to the printing material. Of course, a conversion to gray values which are normalized to the tonal values of the black process ink K is correspondingly also possible.

The conversion, which is to say the normalization of the absolute color measured values in the LAB space, is carried out by normalizing the color value for the printing material, which is to say for the paper white, to the value $L^*=100$ and $a^*=b^*=0$. In order to carry out this normalization to the paper white, a paper white area 6 is provided jointly with the colored gray areas 2a to 2e. A non-printed area in the environment of the colored gray elements 1 can also be provided instead of a dedicated paper white area 6.

The colored gray elements 1 are therefore printed onto a printing material in a printing press together with corresponding printing originals, i.e. printing images. The printed colored gray elements 1 are measured after the printing process and the absolute color values of the colored gray areas 2a to 2e and of the paper white area 6 are determined. A corresponding table relating to the measured color gray areas 2a to 2e and the paper white area 6 is illustrated in FIG. 2.

The paper white area 6 is defined by the absence of any process ink CMYK. The tonal values for cyan, magenta and yellow are then 0. The absolute color measured values for the paper white, according to FIG. 2, result in $L^*_{ab}=95.83$, $a^*_{ab}=-0.78$ and $b^*_{ab}=-1.87$. The absolute color values for the individual colored gray areas 2a to 2e are illustrated in the corresponding columns of the table of FIG. 2.

In the next step, the absolute color measured values determined in this way are converted into relative color measured values by the paper white being assigned a color value $L^*=100.00$, $a^*=0.00$, $b^*=0.00$. A conversion of the absolute color measured values in the LAB space for the different colored gray areas 2a-2e can be carried out, for example, firstly by converting the color measured values for the colored gray areas 2a-2e and the paper white 6 from CIELAB to CIEXYZ in accordance with a known conversion method. A calculation of relative measured values in the CIEXYZ space is then carried out on the basis of the known absolute color values for the paper white, and is then calculated back again into relative color measured values in the LAB space in accordance with the known linking of the two color spaces LAB and XYZ. The term LAB space means, for example, the color space according to CIE 1976 $L^*a^*b^*$, and color space XYZ means the space according to CIE 1931 XYZ.

The relative color measured values in the CIELAB space, converted in accordance with these calculations, are illustrated in the table according to FIG. 3.

Three color measured values 7b, 7c, 7e are selected from these measured relative color measured values, which firstly lie closest to the gray axis of the device-independent color space and at the same time lie in different quadrants of a chroma plane 8 of this space. The distance to the gray axis is calculated on its own through the difference between the chroma values, i.e. the a* and b* values, and the value 0 according to the formula:

$$C^* = \sqrt{a^{*2} + b^{*2}} \quad (1)$$

The colored gray areas 2b, 2c and 2e according to FIG. 3 are determined as a value combination with the smallest distances from the gray axis. This is done by taking into account the quadrant in which these color values lie. The quadrants are determined by the signs of the chroma values a* and b*. Furthermore, the color values 7b, 7c and 7e, which correspond to these colored gray areas 2b, 2c and 2e, are emphasized.

Figure 4:
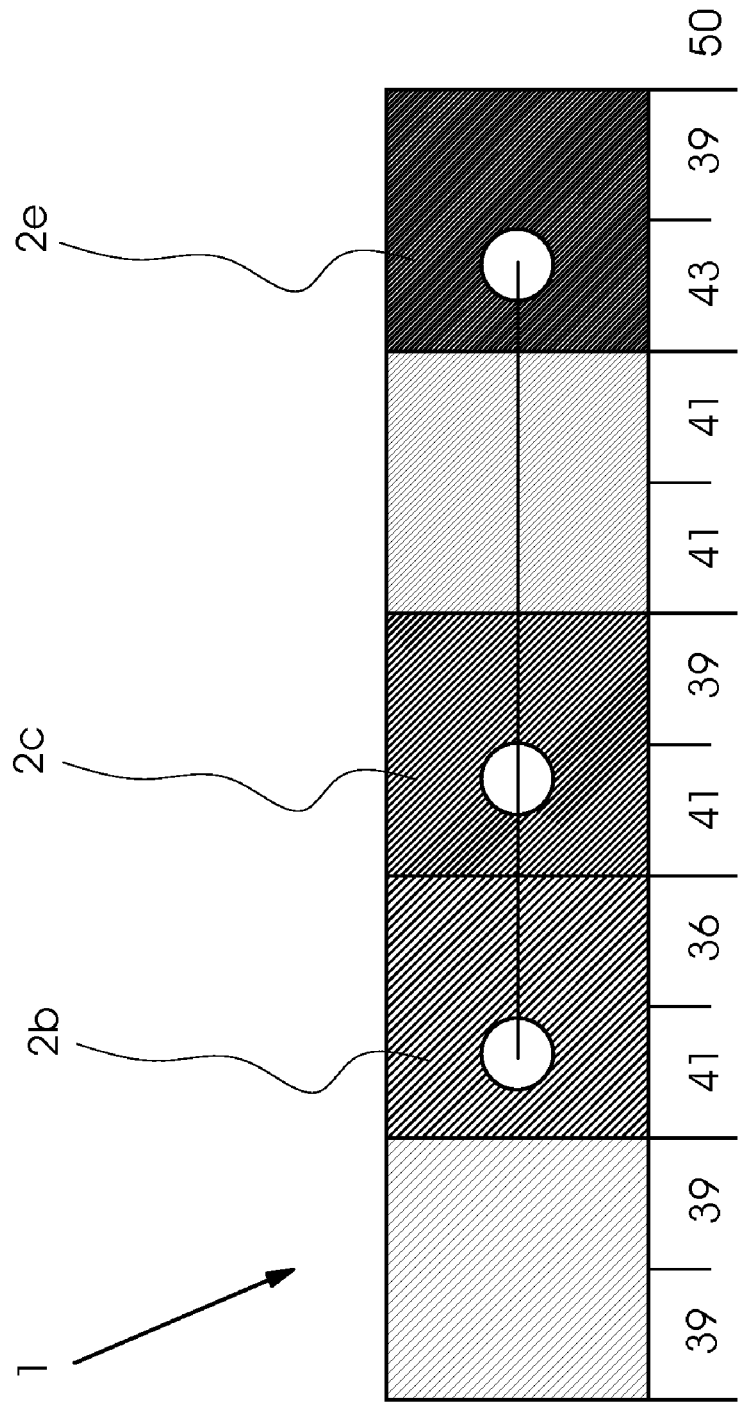
FIG. 4 is a top-plan view showing a selection of colored gray areas from the test form.

FIG. 4 illustrates the colored gray areas 2b, 2c and 2e which obey the conditions that they lie closest to the gray axis and are assigned to the different quadrants of the LAB space. For the purpose of improved illustration, provision can also be made for this representation to be displayed on a display device.

Figure 5:
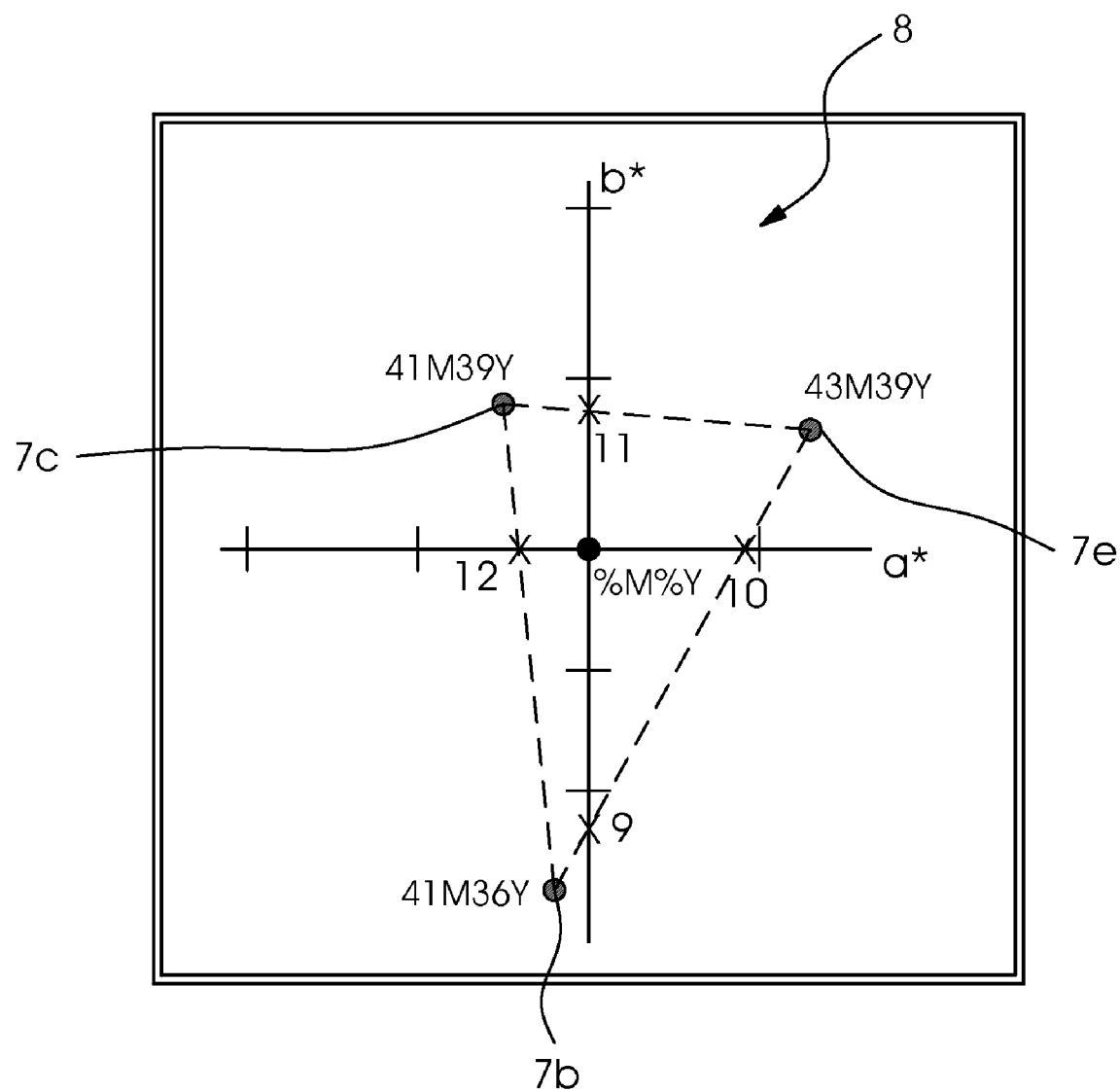
FIG. 5 is a representation of selected colored gray areas in an independent color space.

FIG. 5 shows the color values 7b, 7c and 7e of the measured and selected colored gray areas 2b, 2c, 2e according to FIG. 4 in the chroma plane 8 of the LAB space, which is covered by the components a* and b*.

Only the colored components of these color values 7b, 7c, 7e are taken into account for the determination of corrected tonal value set points and in order to also illustrate how to select the color values of the colored gray areas 2a to 2e and the color values 7b, 7c, 7e.

Interpolated tonal values 4 and 5 and the magenta and yellow process inks which would result in color values 9, 10, 11, 12 which in each case would lie at least on one axis a* or b* of the chroma plane 8, can then be calculated through the use of linear interpolation from the colored components determined in this way, which is to say the (a*-b*) components of the color values 7b, 7c, 7e.

The following interpolated tonal value combinations are then given by linear interpolation from the a*, b* components of the color values 7b, 7c and 7e according to FIG. 3:

For the color value $$(A^*; B^*) = (0.00; 0.79) \rightarrow (M; Y) = (41.58; 39.00)$$

$$(A^*; B^*) = (-0.40; 0.00) \rightarrow (M; Y) = (41.00; 38.13)$$

$$(A^*; B^*) = (0.00; -1.91) \rightarrow (M; Y) = (41.17; 39.00)$$

$$(A^*; B^*) = (0.95; 0.00) \rightarrow (M; Y) = (41.00; 38.35) \quad (2)$$

New corrected tonal value set points for the magenta and yellow inks can be determined from these interpolated tonal values for the magenta and yellow process inks, through the use of renewed interpolation from the color values 9, 10, 11, 12 and their connection with the corresponding tonal values MY, which should result in color values that at least lie closer to the nominal gray value than the tonal value combination of the previous central colored gray area 2c.

From the ratio of the distance of the tonal values for magenta of the points 9 and 11 to the distance of the corresponding color values from each other, the result according to the formula $$M + X = M + \left(\frac{1.91}{1.91 + 0.79}\right) \times 41.58 - 41.17$$

$$= M + 0.29 \Rightarrow M_{corr}$$

$$= 41.17 + 0.29$$

$$= 41.46$$

as the new corrected tonal value set point for the nominal gray value for magenta is 41.46%.

The value combination for CMY 50/41, 46/38, 29 is then stored in the process calibration as the tonal value set point combination for the nominal gray tonal value and used for the exposure of further following printing plates.

During the exposure of following printing plates, corresponding new process control strips with colored gray elements 1 are used which, as the central colored gray areas 2c, have tonal values 4, 5 that result from the new corrected tonal value set points. The colored gray areas 2a, 2b and 2d, 2e are correspondingly formed in steps of 2 percentage points differing from these values on the basis of these corrected tonal values 4, 5.

Figure 6:
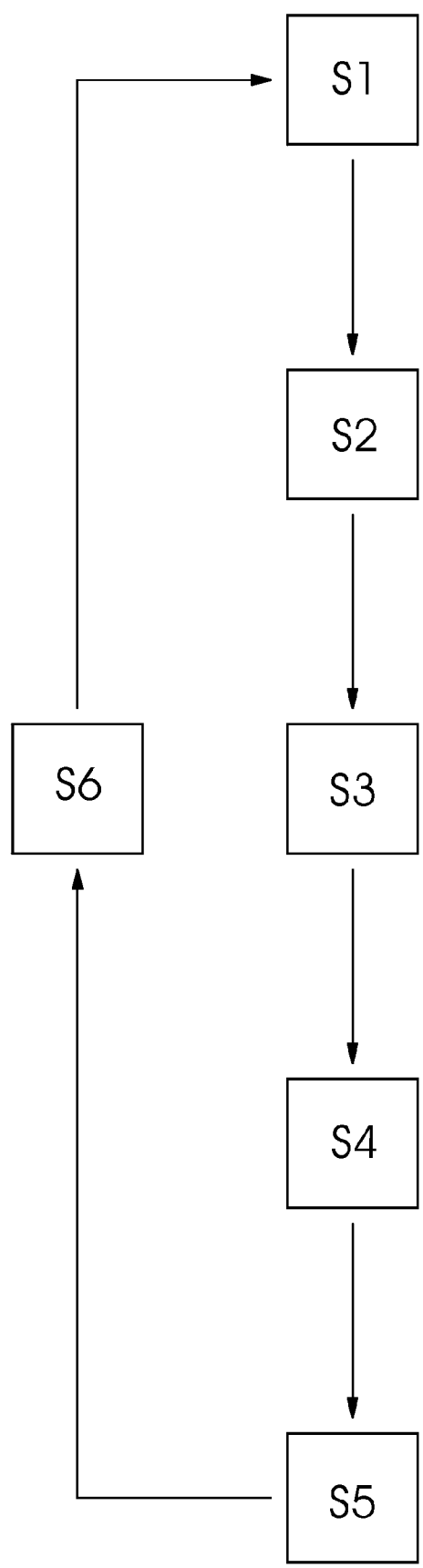
FIG. 6 is a flow chart relating to the correction of the gray balance.

During subsequent printing processes, these colored gray elements 1 newly formed in this way are printed again and evaluated as described. In this way, through the use of a correspondingly iterative method, more and more optimal tonal value combinations can be formed for tonal values 4, 5 of magenta and yellow which better correspond to the predefined nominal gray value. FIG. 6 shows a flow chart of the method described for correcting the predefined tonal value set points for CMY which correspond to a specific nominal gray value. This correction to the gray balance is carried out in that, in a first step S1, printing plates are exposed with process control strips which include appropriate colored gray elements (1) for different nominal gray values.

These colored gray elements 1 are built up as outlined from different colored gray areas 2a to 2e, with a central colored gray area 2c and colored gray areas 2a, 2b and 2d, 2e deviating therefrom being provided.

In a second step S2, provision is made for a printing material to be printed within a printing press through the use of the exposed printing plates. In this way, the colored gray elements 1 of the process control strips are depicted on the printing material.

In a step S3, the colored gray elements 1 of the different process control strips are measured calorimetrically with appropriate measuring apparatus. For this purpose, for example, photoelectric calorimeters can be provided which provide optical filtering of reflected directed light through the use of a tristimulus filter. In principle, a spectral color measurement of reflected, returned or transmitted light can be carried out for this purpose.

In this way, in step S3 it is possible to determine which color values correspond to the different colored gray areas 2a to 2e.

In a step S4, depending on the measured chroma values, i.e. the value pairs (a*/b*) in the device-independent color space LAB, a selection of three colored gray areas 2b, 2c and 2e is made which lie in different quadrants of the device-independent color space and in each case come closest to the gray curve, i.e. the point with (a*/b*)=(0/0).

In a step S5, on the basis of the a*b* values from these selected colored gray areas, through the use of interpolation, a combination of corrected tonal value set points is determined for the tonal values 4, 5 of the magenta and yellow process inks which were varied in the colored gray areas 2a to 2e of the colored gray element 1. These corrected tonal value set points for magenta and yellow, together with the tonal value 3 for the cyan process ink, which was kept constant, yields a triplet of tonal values 3,4,5 which come closer to the predefined nominal gray value than the previous predefinition in the central colored gray area 2c.

In a step S6, the original central colored gray area 2c is matched to the corrected tonal value combination and the other variable colored gray areas 2a, 2b and 2d, 2e are varied appropriately at intervals of 2 percentage points each. In addition, a new process calibration is carried out for the further exposure of printing plates from the corrected combinations of tonal value set points for the nominal gray values of the various colored gray elements 1 of the process control strip. This is accomplished by these tonal value combinations being assigned to the nominal gray values and the gray values lying between these gray values being determined through the use of an appropriate smooth and harmonious correction curve.

On the basis of step S6, new colored gray elements 1 are formed with the corrected colored gray areas 2a to 2e and these are then inserted into the process control strips in the printing plates exposed in accordance with the new process calibration. On the basis of these corrected colored gray elements 1, a new imaging of printing plates and a new determination of corrected tonal value set points are carried out according to steps S1 to S5.

Through the use of this iterative method, a better and better approximation to the tonal value set points for the chromatic inks for the gray balance to the actual nominal gray values can be formed without color errors occurring in other regions, as would be the case as a result of a correction through the use of zone control screws.

The invention claimed is:

1. In a method for correcting the gray balance of a printing process, which includes imaging printing forms assigned to color separations with at least one test form, and printing at least one printing material with the printing forms in a printing press and calorimetrically measuring the test form printed onto the printing material, the improvement comprising:
providing the at least one test form with colored gray areas;
building-up the colored gray areas from at least three different non-black process inks;
assigning at least three colored gray areas to surroundings of the same nominal gray value within a device-independent color space;
causing the tonal values of at least one process ink of the at least three colored gray areas in at least two colored gray areas to deviate from a tonal value assigned to the nominal gray value, so that the colored gray areas have tonal value combinations differing from one another in pairs;
determining the color values of the at least three colored gray areas in the device-independent color space after the colorimetric measurement;
selecting at least two colored gray areas from the measured colored gray areas;
determining at least one corrected tonal value of a non-black chromatic process ink having different tonal values in the selected colored gray areas on the basis of the color values determined for the selected colored gray areas; and
recording the corrected tonal value as a corrected set point for the chromatic process ink for the corresponding nominal gray value of the device-independent color space for imaging following printing forms.

2. The method according to claim 1, which further comprises selecting the tonal values of the at least one deviating process ink in such a way that the color values of at least two colored gray areas lie in different regions of the device-independent color space, and the at least two colored gray areas selected from the measured colored gray areas have color values in different quadrants of the device-independent color space.

3. The method according to claim 1, which further comprises:
covering at least five colored gray areas with the at least one test form;
building-up the colored gray areas from at least three different chromatic process inks;
providing one process ink in all of the colored gray areas of a test form with a constant tonal value;
assigning each test form to the surroundings of a nominal gray value of the device-independent color space;
providing a central colored gray area built up from first predefined set points of tonal values assigned to the nominal gray value assigned to the test form;
varying the variable chromatic process inks not being kept constant in the other colored gray areas of the test form causing higher and lower tonal values to be used which deviate from the first predefined set points in the central colored gray area; and
providing the different colored gray areas with combinations of tonal values of the process inks being different in pairs.

4. The method according to claim 3, which further comprises carrying out the deviations from the set points of the tonal values in steps of ±2% to ±3%.

5. The method according to claim 3, which further comprises:
selecting at least three colored gray areas lying in different quadrants of the device-independent color space, from the measured colored gray areas;
calculating an interpolated tonal value corresponding to a color value on an axis of the device-independent color space by a one-dimensional linear interpolation between two colored gray areas for each process ink; and
determining new corrected set points of the tonal values corresponding to at least one actually printed color value lying closer to the nominal gray value of the device-independent color space than the printed gray value of the central colored gray area, by iterative repetition of the linear interpolation for the variable process inks.

6. The method according to claim 1, which further comprises normalizing the color values of the colored gray areas to a white point of the printing material.

7. The method according to claim 1, which further comprises normalizing the color values of the colored gray areas to equally light color values of the black process ink.

8. The method according to claim 5, which further comprises selecting the colored gray areas in the device-independent color space having color values lying closest to the gray axis of the device-independent color space.

9. The method according to claim 1, which further comprises providing the at least one test form with a paper white area for determining a white point of the paper.

10. The method according to claim 1, which further comprises displaying measured values from the calorimetric measurement of the colored gray areas in a diagram on a display device.

11. The method according to claim 1, which further comprises using only color value components of one plane of the device-independent color space to determine the corrected or interpolated tonal values.

12. The method according to claim 1, which further comprises using only color value components of a chroma plane of the device-independent color space to determine the corrected or interpolated tonal values.

13. The method according to claim 1, which further comprises:
  imaging various test forms having different nominal gray values on printing forms;
  determining corrected set points for tonal values of the chromatic inks assigned to the nominal gray values on the basis of the test forms; and
  determining corrected tonal values by a smooth and harmonious correction curve for gray values lying between the gray values of the test forms.

14. The method according to claim 13, which further comprises using the correction curve for process calibration of following printing forms.

15. The method according to claim 1, which further comprises:
  imaging the test forms in a manner of print control strips in individual inking zones of printing forms used for a conventional print in a printing press; and
  regularly evaluating the test forms to achieve a corrected process calibration for following imaged printing forms.

* * * * *